United States Patent [19]

Hayashi et al.

[11] Patent Number: 5,093,384
[45] Date of Patent: Mar. 3, 1992

[54] HEAT INSULATOR MADE OF SHAPE MEMORY POLYMER FOAM

[75] Inventors: Shunichi Hayashi, Nagoya; Akira Ishibashi; Tetsuyoshi Ikenoue, both of Tokyo, all of Japan

[73] Assignee: Mitsubishi Jukogyo Kabushiki Kaisha, Tokyo, Japan

[21] Appl. No.: 423,190

[22] Filed: Oct. 18, 1989

[30] Foreign Application Priority Data

Oct. 21, 1988 [JP] Japan .................... 63-264169

[51] Int. Cl.$^5$ .................... C08G 18/42
[52] U.S. Cl. .................... 521/159; 521/155; 521/161; 521/170
[58] Field of Search .................... 521/159, 155, 161, 170

[56] References Cited

U.S. PATENT DOCUMENTS

| | | | |
|---|---|---|---|
| 2,927,905 | 3/1960 | Eckert | 521/159 |
| 3,856,716 | 12/1974 | Jenkins et al. | 521/159 |
| 4,061,662 | 12/1977 | Marans et al. | 521/159 |
| 4,350,777 | 9/1982 | Henrichs et al. | 521/159 |
| 4,495,081 | 1/1985 | Vanderhider et al. | 521/159 |
| 4,990,545 | 2/1991 | Hourai et al. | 521/177 |

Primary Examiner—John Kight, III
Assistant Examiner—J. Cooney, Jr.
Attorney, Agent, or Firm—McAulay Fisher Nissen Goldberg & Kiel

[57] ABSTRACT

A heat insulator made of shape memory polymer foam which has good moldability and changes greatly in elastic modulus above and below its glass transition point, and a heat insulator as mentioned above in which the polymer foam is polyurethane produced by prepolymer process from a composition containing a blowing agent, said composition being composed of a difunctional diisocyanate, a difunctional polyol, and a difunctional chain extender containing active hydrogen in a molar ratio of 2.00-1.10:1.00:1.00-0.10, said polyurethane containing approximately equal amounts of NCO groups and OH groups at the terminals of the molecular chains and having a glass transition point of $-50°$ to $60°$ C. and crystallinity of 3 to 50 wt %.

7 Claims, 1 Drawing Sheet

HEAT INSULATOR MADE OF SHAPE MEMORY POLYMER FOAM

FIELD OF THE INVENTION AND RELATED ART STATEMENT

The present invention relates to a heat insulator which is superior in moldability, has the shape memory performance, and effectively utilizes the change in elastic modulus which takes place above and below the glass transition point.

Conventional heat insulators for pipes, tubes, containers, flat plates, and other odd-shaped moldings used to be produced from plastic foams such as polyurethane foam, polyethylene foam, polystyrene foam, and rubber sponge.

There are a large variety of polymer moldings, among which are the shape memory polymer moldings which take on the as-molded shape and the deformed shape depending on the temperature at which they are used.

The moldings of the shape memory polymer become set in the deformed shape when they are deformed at a temperature higher than the glass transition point of the polymer and lower than the molding temperature of the polymer and then cooled below the glass transition point while being kept in the deformed state. They restore their original as-molded shape when heated above the glass transition point.

Conventional heat insulators made of plastic foams are used in the as-molded shape. Most of them have a high elastic modulus, but some plastic foams have a very low elastic modulus. Such plastic foams contain a large amount of air and hence are very bulky for their weight. Therefore, it is very difficult or even impossible to pack and transport a large quantity of them at one time. Their bulkiness makes their storage inconvenient.

In addition, conventional heat insulators have other shortcomings. They need complex working when they are attached to pipes and tubes or odd-shaped containers and the heat-insulated objects are mounted. The complex working takes a long time and costs much.

The shortcomings of conventional plastic foams can be eliminated by using the moldings of the above-mentioned shape memory polymer which take on the as-molded shape and deformed shape at different temperatures. In other words, they take on one shape convenient for packing, transportation, storage, and mounting, and they also take on another shape convenient for ordinary use. Unfortunately, the shape memory polymer proposed so far is a polyurethane having a large amount of excess NCO groups at the terminals of the molecular chains, and the excess NCO groups bring about crosslinking reactions, forming a network polymer which is very poor in processability. Therefore, it is extremely difficult to produce a heat insulator of shape memory polymer by ordinary molding methods such as injection molding, extrusion molding, blow molding, and casting.

OBJECT AND SUMMARY OF THE INVENTION

It is an object of the present invention to provide a heat insulator having good moldability and shape memory performance. The heat insulator can be easily deformed into a shape convenient for packing, transportation, storage, and mounting, and it can also be easily returned to its original shape when it is used for heat insulation.

The object of the present invention is achieved with (1) a heat insulator made of shape memory polymer foam which has good moldability and changes greatly in elastic modulus above and below its glass transition point, and (2) a heat insulator as mentioned above in which the polymer foam is polyurethane produced by prepolymer process from a composition containing a blowing agent, said composition being composed of a difunctional diisocyanate, a difunctional polyol, and a difunctional chain extender containing active hydrogen in a molar ratio of 2.00-1.10 : 1.00 : 1.00-0.10, said polyurethane containing approximately equal amounts of NCO groups and OH groups at the terminals of the molecular chains and having a glass transition point of $-50°$ to $60°$ C. and a crystallinity of 3 to 50 wt%.

The heat insulator of the present invention is molded in its original shape suitable for heat insulator. When it is heated above its glass transition point (Tg for short hereinafter), it greatly increases in elastic modulus. Therefore, it decreases in volume when heated and compressed at a temperature higher than its Tg and lower than its molding temperature. As the heat insulator is cooled below its Tg in the compressed state, it extremely decreases in its elastic modulus and hence become set in the compressed form.

The heat insulator in compressed form facilitates packing, transportation, storage, and mounting. After the heat insulator has been attached to an object and the insulated object has been mounted in place, the heat insulator is heated to the temperature above its Tg at which it has been compressed, so that it restores its original shape and functions as it is intended.

It is necessary, therefore, that the heat insulator of the present invention (or the polymer from which the heat insulator is produced) should have a Tg which is lower than the temperature at which the heat insulator is normally used.

For the heat insulator of the present invention to be produced at a low cost, the polymer (as the raw material) should have a good moldability. This requirement is met by polyurethane produced by prepolymer process from a composition containing a blowing agent, said composition being composed of a difunctional diisocyanate, a difunctional polyol, and a difunctional chain extender containing active hydrogen in a molar ratio of 2.00-1.10 : 1.00 : 1.00-0.10, said polyurethane containing approximately equal amounts of NCO groups and OH groups at the terminals of the molecular chains and having a glass transition point of $-50°$ to $60°$ C. and a crystallinity of 3 to 50 wt%.

Having no excess NCO groups at the terminals of the molecular chain, the polyurethane in the present invention does not undergo crosslinking but remains to be of chain structure. In addition, it is thermoplastic and moldable owing to the crystallinity in the above-mentioned range.

The heat insulator of the present invention can be used in various districts ranging from cold to hot, because it has a Tg in the above-mentioned range.

The polyurethane in the present invention is produced from the following raw materials.

A difunctional isocyanate which is represented by the general formula OCN-R-NCO, where R denotes one or two phenylene groups or R may be absent. It includes, for example, 2,4-toluene diisocyanate, 4,4'-diphenylmethane diisocyanate, carbodiimide-modified 4,4'- diphenylmethane diisocyanate, and hexamethylene diisocyanate.

A difunctional polyol which is represented by the general formula OH-R'-OH, where R' denotes one or two phenylene groups or R' may be absent. It may also be a reaction product of said difunctional polyol and a difunctional carboxylic acid or cyclic ether. It includes, for example, polypropylene glycol, 1,4-butane glycol adipate, polytetramethylene glycol, polyethylene glycol, and an adduct of bisphenol-A with propylene oxide.

A difunctional chain extender containing active hydrogen which is represented by the general formula OH- R"-OH, where R" denotes a $(CH_2)_n$ group [where n is an integer of 1 and above] or one or two phenylene groups. It may also be a reaction product of said chain extender and a difunctional carboxylic acid or cyclic ether. It includes, for example, ethylene glycol, 1,4-butane glycol, bis(2-hydroxyethyl)hydroquinone, an adduct of bisphenol-A with ethylene oxide, and an adduct of bisphenol-A with propylene oxide.

The polyurethane produced from these raw materials may be represented by the following general formula.

HOR"OCONH(RNHCOOR'OCONH)$_n$RNH-COOR"OCONH(RNHCOOR'OCONH)$_m$RNH-COOR"OH where R, R', and R" are defined as above, and m is 1-16 and n is 0-16.

The blowing agent that can be used in the present invention may be either of decomposition type which evolves a gas upon chemical decomposition or of evaporation type which evolves a gas without chemical reaction.

The blowing agent of decomposition type may be divided into inorganic ones and organic ones, the former including sodium bicarbonate, ammonium bicarbonate, azide compounds, sodium borohydrate, and light metals which generate hydrogen upon reaction with water, and the latter including azodicarbonamide, azobisformamide, and N,N'-dinitrosopentamethylenetetramine.

The blowing agent of evaporation type includes compressed nitrogen gas and trichloromonofluoromethane.

BRIEF DESCRIPTION OF THE DRAWINGS

FIG. 3 is a perspective view showing the pipe (as shown in FIG. 2), with the heat insulator (as shown in FIG. 1) on.

DETAILED DESCRIPTION OF PREFERRED EMBODIMENTS

Figure 1:
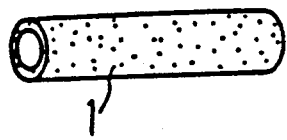
FIG. 1 is a perspective view showing the heat insulator of the present invention which is applied to a pipe.
Figure 2:
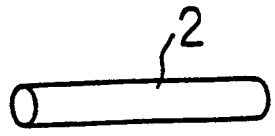
FIG. 2 is a perspective view showing a pipe to which the heat insulator shown in FIG. 1 is applied.

The invention will be described in more detail with reference to the following examples, which are not intended to restrict the scope of the invention.

[1] Preparation of heat insulators from polyurethane

First, a prepolymer was prepared by reacting, in the absence of catalyst, a diisocyanate and a polyol in the ratio shown in Table 1. To the prepolymer was added a chain extender in the ratio shown in Table 1. To 100 parts by weight of the resulting mixture was added 20 parts by weight of blowing agent (trichloromonofluoromethane having a boiling point of 23.8° C.). The mixture was heated and poured into a mold, followed by curing at 120° C. for 20 minutes to 10 hours. Thus there was obtained a hollow cylindrical heat insulator 1 (9.5 cm in inside diameter and 4 cm thick) for pipes, which is made of shape memory polyurethane foam.

This polyurethane foam has an expansion ratio of 20 and also has the basic physical properties as shown in Table 1. Incidentally, E/E' in Table 1 is defined by:

$$E/E' = \frac{\text{Tensile modulus at } (Tg - 10° \text{ C.})}{\text{Tensile modulus at } (Tg + 10° \text{ C.})}$$

and the crystallinity (wt%) was measured by X-ray diffractometry.

TABLE 1

| Raw materials and molar ratio | M.W. | 1 | 2 | 3 | 4 | 5 | 6 | 7 | 8 | 9 | 10 |
|---|---|---|---|---|---|---|---|---|---|---|---|
| Diisocyanate | | | | | | | | | | | |
| 2,4-toluene diisocyanate | 174 | 1.5 | | | 1.5 | | | | | | |
| 4,4'-diphenylmethane diisocyanate | 250 | | | | | 1.5 | | | 1.5 | 1.5 | 1.5 |
| 4,4'-diphenylmethane diisocyanate (carbodiimide-modified) | 290 | | | | | | 1.5 | | | | |
| 4,4'-diphenylmethane diisocyanate (carbodiimide-modified) | 303 | | 1.5 | 1.5 | | | | | | | |
| hexamethylene diisocyanate | 168 | | | | | | | 1.5 | | | |
| Polyol | | | | | | | | | | | |
| polypropylene glycol | 400 | | | | | | | | | | |
| polypropylene glycol | 700 | | | 1.0 | 1.0 | 1.0 | 1.0 | 1.0 | 1.0 | 1.0 | 1.0 |
| polypropylene glycol | 1000 | | 0.88 | | | | | | | | |
| 1,4-butaneglycol adipate | 600 | | | | | | | | | | |
| 1,4-butaneglycol adipate | 1000 | | | | | | | | | | |
| 1,4-butaneglycol adipate | 2000 | | | | | | | | | | |
| polytetramethylene glycol | 650 | | | | | | | | | | |
| polytetramethylene glycol | 850 | | | | | | | | | | |

TABLE 1-continued

| Raw materials and molar ratio | M.W. | | | | | | | | | | |
|---|---|---|---|---|---|---|---|---|---|---|---|
| polytetramethylene glycol | 1000 | | | | | | | | | | |
| polyethylene glycol | 600 | | | | | | | | | | |
| bisphenol-A + propylene oxide | 800 | 1.0 | | | | | | | | | |
| Chain extender | | | | | | | | | | | |
| ethylene glycol | 62 | | | | | | | | 0.51 | | |
| 1,4-butane glycol | 90 | 0.51 | | | | | | | | 0.51 | |
| bis(2-hydroxyethyl) hydroquinone | 198 | | | | | | | | | | |
| bisphenol-A + ethylene oxide | 327 | | | | | | | | | | |
| bisphenol-A + ethylene oxide | 360 | | 0.51 | 0.51 | 0.51 | 0.51 | 0.51 | 0.51 | | | |
| bisphenol-A + propylene oxide | 360 | | | | | | | | | | 0.51 |
| Measured values of physical properties | | | | | | | | | | | |
| Tg (°C.) | | 24 | −10 | 15 | −11 | 14 | 16 | −45 | 9 | 6 | 12 |
| E/E' | | 170 | 73 | 69 | 23 | 129 | 133 | 20 | 117 | 128 | 97 |
| Crystallinity (wt %) | | | 20 | 20 | 30 | | | 25 | | | |

| Raw materials and molar ratio | M.W. | 11 | 12 | 13 | 14 | 15 | 16 | 17 | 18 | 19 | 20 |
|---|---|---|---|---|---|---|---|---|---|---|---|
| Diisocyanate | | | | | | | | | | | |
| 2,4-toluene diisocyanate | 174 | | | | | | | | | | |
| 4,4'-diphenylmethane diisocyanate | 250 | 1.5 | 1.5 | 1.5 | 1.2 | 1.8 | 1.35 | 1.35 | 1.35 | 1.35 | 1.35 |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |
| polypropylene glycol | 400 | | | | | | | | | | |
| polypropylene glycol | 700 | 1.0 | 1.0 | | 1.0 | 1.0 | 1.0 | | | | |
| polypropylene glycol | 1000 | | | | | | | 1.0 | | | |
| 1,4-butaneglycol adipate | 600 | | | | | | | | 1.0 | | |
| 1,4-butaneglycol adipate | 1000 | | | | | | | | | 1.0 | |
| 1,4-butaneglycol adipate | 2000 | | | | | | | | | | 1.0 |
| polytetramethylene glycol | 650 | | | | | | | | | | |
| polytetramethylene glycol | 850 | | | | | | | | | | |
| polytetramethylene glycol | 1000 | | | | | | | | | | |
| polyethylene glycol | 600 | | | 1.0 | | | | | | | |
| bisphenol-A + propylene oxide | 800 | | | | | | | | | | |
| Chain extender | | | | | | | | | | | |
| ethylene glycol | 62 | | | | | | | | | | |
| 1,4-butane glycol | 90 | | | | | | | | | | |
| bis(2-hydroxyethyl) hydroquinone | 198 | | 0.51 | | | | | | | | |
| bisphenol-A + ethylene oxide | 327 | 0.51 | | | 0.21 | 0.81 | 0.36 | 0.36 | 0.36 | 0.36 | 0.36 |
| bisphenol-A + ethylene oxide | 360 | | | | | | | | | | |
| bisphenol-A + propylene oxide | 360 | | | | | | | | | | |
| Measured values of physical properties | | | | | | | | | | | |
| Tg (°C.) | | 16 | −7 | −6 | −4 | 25 | 5 | −22 | 10 | −18 | −45 |
| E/E' | | 111 | 49 | 12 | 105 | 53 | 37 | 81 | 100 | 29 | 30 |
| Crystallinity (wt %) | | | 20 | 30 | | 20 | 25 | | | 25 | 25 |

| Raw materials and molar ratio | M.W. | 21 | 22 | 23 | 24 | 25 | 26 | 27 | 28 | 29 | 30 |
|---|---|---|---|---|---|---|---|---|---|---|---|
| Diisocyanate | | | | | | | | | | | |
| 2,4-toluene diisocyanate | 174 | | | | | | | 1.5 | 1.4 | 1.3 | 1.2 |
| 4,4'-diphenylmethane diisocyanate | 250 | 1.35 | 1.35 | 1.35 | 1.5 | 1.5 | 1.35 | | | | |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |

TABLE 1-continued

| Raw materials and molar ratio | M.W. | | | | | | | | | | |
|---|---|---|---|---|---|---|---|---|---|---|---|
| hexamethylene diisocyanate | 168 | | | | | | | | | | |
| Polyol | | | | | | | | | | | |
| polypropylene glycol | 400 | | | | | | 1.0 | | | | |
| polypropylene glycol | 700 | | | | 1.0 | 1.0 | | | | | |
| polypropylene glycol | 1000 | | | | | | | | | | |
| 1,4-butaneglycol adipate | 600 | | | | | | | | | | |
| 1,4-butaneglycol adipate | 1000 | | | | | | | | | | |
| 1,4-butaneglycol adipate | 2000 | 1.0 | | | | | | | | | |
| polytetramethylene glycol | 650 | 1.0 | | | | | | | | | |
| polytetramethylene glycol | 850 | | 1.0 | | | | | | | | |
| polytetramethylene glycol | 1000 | | | 1.0 | | | | | | | |
| polyethylene glycol | 600 | | | | | | | | | | |
| bisphenol-A + propylene oxide | 800 | | | | | | | 1.0 | 1.0 | 1.0 | 1.0 |
| Chain extender | | | | | | | | | | | |
| ethylene glycol | 62 | | | | | | | | | | |
| 1,4-butane glycol | 90 | | | | | | | | | | |
| bis(2-hydroxyethyl) hydroquinone | 198 | | | | | | | 0.51 | 0.41 | 0.31 | 0.21 |
| bisphenol-A + ethylene oxide | 327 | 0.36 | 0.36 | 0.36 | 0.43 | 0.35 | 0.36 | | | | |
| bisphenol-A + ethylene oxide | 360 | | | | | | | | | | |
| bisphenol-A + propylene oxide | 360 | | | | | | | | | | |
| Measured values of physical properties | | | | | | | | | | | |
| Tg (°C.) | | −18 | −30 | −38 | 5 | 8 | 23 | 26 | 21 | 19 | 19 |
| E/E' | | 33 | 18 | 40 | 33 | 100 | 126 | 140 | 125 | 108 | 101 |
| Crystallinity (wt %) | | 25 | 25 | 25 | 25 | 15 | 15 | 10 | 15 | 15 | 15 |

| Raw materials and molar ratio | M.W. | 31 | 32 | 33 | 34 | 35 | 36 | 37 | 38 | 39 | 40 |
|---|---|---|---|---|---|---|---|---|---|---|---|
| Diisocyanate | | | | | | | | | | | |
| 2,4-toluene diisocyanate | 174 | | | 1.5 | | | | | | | |
| 4,4'-diphenylmethane diisocyanate | 250 | 1.59 | 1.68 | | 1.3 | 1.7 | 1.59 | 1.68 | 1.5 | 1.5 | 1.81 |
| 4,4'-diphenylmethane diisocyanate (carbodiimide-modified) | 290 | | | | | | | | | | |
| 4,4'-diphenylmethane diisocyanate (carbodiimide-modified) | 303 | | | | | | | | | | |
| hexamethylene diisocyanate | 168 | | | | | | | | | | |
| Polyol | | | | | | | | | | | |
| polypropylene glycol | 400 | | | | | | | | | | |
| polypropylene glycol | 700 | 1.0 | 1.0 | | 1.0 | 1.0 | 1.0 | 1.0 | | | |
| polypropylene glycol | 1000 | | | | | | | | | | |
| 1,4-butaneglycol adipate | 600 | | | | | | | | | | |
| 1,4-butaneglycol adipate | 1000 | | | | | | | | | | |
| 1,4-butaneglycol adipate | 2000 | | | | | | | | | | |
| polytetramethylene glycol | 650 | | | | | | | | | | |
| polytetramethylene glycol | 850 | | | | | | | | | | |
| polytetramethylene glycol | 1000 | | | | | | | | | | |
| polyethylene glycol | 600 | | | | | | | | | | |
| bisphenol-A + propylene oxide | 800 | | | 1.0 | | | | | 1.0 | 1.0 | 1.0 |
| Chain extender | | | | | | | | | | | |
| ethylene glycol | 62 | | | | 0.31 | 0.71 | 0.51 | 0.51 | | | |
| 1,4-butane glycol | 90 | | | | | | | | 0.51 | | |
| bis(2-hydroxyethyl) hydroquinone | 198 | | | 0.51 | | | | | | 0.51 | 0.81 |
| bisphenol-A + ethylene oxide | 327 | | | | | | | | | | |
| bisphenol-A + ethylene oxide | 360 | 0.51 | 0.51 | | | | | | | | |
| bisphenol-A + propylene oxide | 360 | | | | | | | | | | |
| Measured values of physical properties | | | | | | | | | | | |
| Tg (°C.) | | 10 | 11 | 22 | 2 | 15 | 11 | 12 | 35 | 40 | 48 |
| E/E' | | 126 | 126 | 107 | 83 | 122 | 100 | 135 | 124 | 138 | 152 |

TABLE 1-continued

| Crystallinity (wt %) | 15 | 20 | 15 | 20 | 15 | 15 | 10 | 10 | 5 | 5 |

[2] Use of the heat insulator

Figure 3:
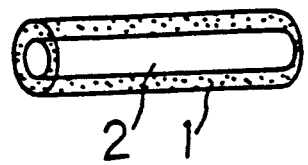
Figure 4:
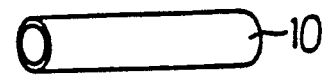
FIG. 4 is a perspective view showing the pipe-heat insulator assembly as shown in FIG. 3, with the heat insulator deformed.

Polyurethane No. 39 in Table 1 was made into a cylindrical heat insulator 1 as shown in FIG. 1. The heat insulator was slipped onto a pipe 2 having an outside diameter slightly smaller than the inside diameter of the heat insulator 1. Thus there was obtained a heat-insulated pipe 3 as shown in FIG. 3. The heat-insulated pipe 3 was heated to 50° C., which is higher than the Tg of the polyurethane, and the heat insulator 1 was compressed by the application of an external force and then cooled below the Tg in the compressed state. Thus there was obtained a heat-insulated pipe 4 (as shown in FIG. 4), with the diameter reduced (or the deformed shape set).

Figure 5:
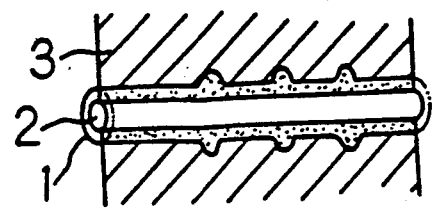
FIG. 5 is a sectional view showing the pipe-heat insulator assembly (as shown in FIG. 4) inserted into a narrow space, with the heat insulator restored to its original shape after heating.

After packing and transportation or storage, the heat-insulated pipe 4 was inserted into a narrow space where piping is necessary. Then it was heated to a temperature above the Tg so that it restored its original cylindrical shape. The heat insulator 1 conformed itself to the shape of the surrounding structure 5 owing to its elasticity, as shown in FIG. 5.

The heat insulator of the present invention offers the following advantages.

(1) When heated above its Tg under stress, it can be reduced in size to facilitate packing, transportation, storage, and attaching to an object. And the object provided with the heat insulator in reduced size can be easily inserted into a narrow space.

(2) When heated again above its Tg, it readily restores its original shape.

(3) It can be available in any complex form because it is produced by a common molding method such as injection molding and blow molding from a specific polyurethane which is a chain polymer owing to the absence of terminal excess NCO groups responsible for crosslinking.

We claim:

1. A heat insulator made of shape memory polymer foam as claimed in claim 1, wherein the polymer foam is polyurethane produced by prepolymer process from a composition containing a blowing agent, said composition being composed of a difunctional diisocyanate, a difunctional polyol, and a difunctional chain extender containing active hydrogen in a molar ratio of 2.00-1.10 : 1.00 : 1.00-0.10, said polyurethane containing approximately equal amounts of NCO groups and OH groups at the terminals of the molecular chains and having a glass transition point of −50° to 60° C. and a crystallinity of 3 to 50 wt%.

2. A heat insulator made of shape memory polymer foam as claimed in claim 1, wherein the difunctional isocyanate is a compound represented by the general formula (I):

OCN-R-NCO  (I)

where R denotes one or two phenylene groups or R may be absent.

3. A heat insulator made of shape memory polymer foam as claimed in claim 1, wherein the difunctional polyol is a compound represented by the general formula (II):

OH-R'-OH  (II)

where R' denotes one or two phenylene groups or R' may be absent.

4. A heat insulator made of shape memory polymer foam as claimed in claim 1, wherein the difunctional polyol is a reaction product of said difunctional polyol and a difunctional carboxylic acid or cyclic ether.

5. A heat insulator made of shape memory polymer foam as claimed in claim 1, wherein the difunctional chain extender containing active hydrogen is a compound represented by the general formula (III):

OH-R''-OH  (III)

where R'' denotes a $(CH_2)_n$ group [where n is an integer of 1 and above] or one or two phenylene groups.

6. A heat insulator made of shape memory polymer foam as claimed in claim 1, wherein the difunctional chain extender containing active hydrogen is a reaction product of said chain extender and a difunctional carboxylic acid or cyclic ether.

7. In a heat insulator of a polyurethane polymer foam having shape memory characteristics, which foam exhibits relatively large variation in its elastic modulus about its glass transition point and becomes rubbery at temperatures above its glass transition point and glassy at temperatures below its glass transition point, the improvement which comprises said heat insulator having been formed in a desired shape by:
   (a) heating the insulator to a temperature above the glass transition point and stressing the insulator at said temperature to reduce its volume;
   (b) cooling the stressed insulator below its glass transition point under said stress conditions to fix it in a shape having a volume less than its original volume, such that upon reheating to a temperature above its glass transition point, the heat insulator resumes its original shape.

* * * * *